United States Patent [19]

Haugland

[11] 4,272,057
[45] Jun. 9, 1981

[54] VALVE AND FASTENER THEREFOR
[75] Inventor: Samuel R. Haugland, Reno, Nev.
[73] Assignee: Delta Dynamics Corporation, Reno, Nev.
[21] Appl. No.: 24,789
[22] Filed: Mar. 28, 1979
[51] Int. Cl.³ .............................................. F16K 5/06
[52] U.S. Cl. .................................... 251/315; 137/315
[58] Field of Search ................ 251/315; 220/319, 320; 137/315

[56] References Cited

U.S. PATENT DOCUMENTS

| | | | |
|---|---|---|---|
| 3,009,680 | 11/1961 | Kaiser | 251/315 |
| 3,171,429 | 3/1965 | Stürmer et al. | 137/315 |
| 3,219,055 | 11/1965 | Dumm | 251/315 |
| 3,275,025 | 9/1966 | Kowalski | 251/315 |
| 3,359,999 | 12/1967 | Mueller | 251/315 |
| 3,576,309 | 4/1971 | Zawacki | 251/315 |
| 3,759,553 | 9/1973 | Carter | 285/260 |
| 3,765,645 | 10/1973 | Paul, Jr. | 251/170 |
| 3,890,999 | 6/1975 | Moskow | 137/505.25 |
| 3,986,635 | 10/1976 | Niskin | 220/319 |
| 4,106,751 | 8/1978 | Niskin | 251/174 |
| 4,151,855 | 5/1979 | Levin et al. | 251/315 |
| 4,171,711 | 10/1979 | Bake et al. | 251/309 |

FOREIGN PATENT DOCUMENTS 2339001  8/1972  Fed. Rep. of Germany ........... 220/319

Primary Examiner—William R. Cline
Assistant Examiner—H. Jay Spiegel
Attorney, Agent, or Firm—Seiler & Quirk

[57] ABSTRACT

An elongate flexible cable is used as a fastener for preventing sliding movement between adjacent surfaces of two valve components. The cable is inserted through a closable port in the valve, and extends through a uniform channel formed by aligned grooves in the two components. In a preferred aspect, the cable fastener is used in conjunction with a spring to retain axial cylindrical seats in operating position in a ball valve.

5 Claims, 7 Drawing Figures

VALVE AND FASTENER THEREFOR

BACKGROUND OF THE INVENTION

This invention relates to full bore ball valves for high pressure applications which are serviceable without removing the valve from the line. In another aspect, the invention relates to a particular method for fastening valve components having adjacent slidable surfaces wherein a channel is formed in the surfaces and an elongate flexible fastening member is inserted into the channel from outside of the valve, thereby preventing relative movement between the components. This particular fastening method allows substantial material savings due to the elimination of closure side bolting normally associated with ball valves, and reduced manufacturing costs because of the simplicity of the valve. In addition to material savings, the simplified valve design of the invention also provides higher seal integrity, simplified material traceability, and in-line serviceability.

In one general aspect of the invention, the ball valve comprises a housing having a tubular passageway to carry the fluid, a valve chamber located in the passageway to hold a generally spherical valve body having an axial bore located within the valve chamber, an opening in the valve housing to permit insertion and removal of valve components, and a removable bonnet to close said opening. A seal is retained by a pair of oppositely disposed, axially oriented cylindrical seats which are biased toward the valve body. This configuration is common to many types of ball valves, and is well known in the art. However, the particular fastener or retainer features of the invention, and combination of biasing means and retainer, are believed novel.

Applicant's search of the prior art revealed the following patents:

U.S. Pat. No. 2,629,615
U.S. Pat. No. 3,037,738
U.S. Pat. No. 3,171,429
U.S. Pat. No. 4,106,751
U.S. Pat. No. 1,738,450
U.S. Pat. No. Re. 23,041
U.S. Pat. No. 3,469,818
U.S. Pat. No. 3,765,645
U.S. Pat. No. 4,071,220

A number of ball valves have axial seats with adjustable seat pressure. For example, Jackson, U.S. Pat. No. 3,037,738 shows seats having external tapered screw adjustments, as well as internal adjustments of seat pressure both with and without biasing means. Paul, U.S. Pat. No. 3,765,645 discloses a ball valve serviceable through the bonnet wherein the seat pressure is adjustable with a single externally operated threaded wedge. In the Paul patent, bonnet closure is effected by a series of ball bearings located in aligned grooves in the bonnet and the body.

Iino, U.S. Pat. No. 4,071,220 shows an annular spring member which is fixed in the valve seal to urge the seats toward the ball. However, these spring members are not used as retainers, and are not accessible from outside of the valve. An externally removable ring-type retainer is shown in Niskin, U.S. Pat. No. 4,106,751; the ring slides around an annular groove between the casing and a removable internal retainer. The ring is not used in connection with a seat biasing member, but is simply a closure mechanism for the end of the valve. Other seat biasing means similar to the Jackson and Paul patents are shown in Ryan et al, U.S. Pat. No. 1,738,450, and Sturmer et al, U.S. Pat. No. 3,171,429. However, no disclosures of valves using the fastening mechanisms or seat biasing means of the invention are known to the inventor.

Accordingly, it is an object of the invention to provide a novel fastening mechanism to prevent relative movement between valve components having adjacent surfaces. More particularly, it is an object of the invention to provide a ball valve seat retainer which is removable through a port in the valve housing. In another aspect of the invention, a one piece, elongate flexible fastener is provided for rapid removal of the valve bonnet from the valve housing. It is yet another object of the invention to provide a combination of an externally accessible, flexible elongated fastener with a biasing means to provide a uniform, integral seal in a ball valve. These and other objects of the invention will be apparent from the following description of a preferred embodiment of the invention.

SUMMARY OF THE INVENTION

A fastening mechanism to prevent relative movement between valve components having adjacent surfaces comprises a toroidal channel formed by aligned grooves in the surfaces of each component, an elongate flexible fastener substantially incompressible along its cross-section slidably mounted in the channel, and a closeable port in the valve housing communicating with the channel for insertion and removal of the fastener. In a ball valve having axial seat rings, a uniform circumferential recess on the rearward portion of the seat ring and a circumferential shoulder within the valve chamber align to form an annular channel, the channel being accessible from outside the valve through the port in the valve housing, and an elongate flexible fastener located in the channel prevents axial movement of the seat away from the valve body.

BRIEF DESCRIPTION OF THE DRAWINGS

The invention is best understood with reference to the drawings, in which.

DETAILED DESCRIPTION OF THE INVENTION

Figure 1:
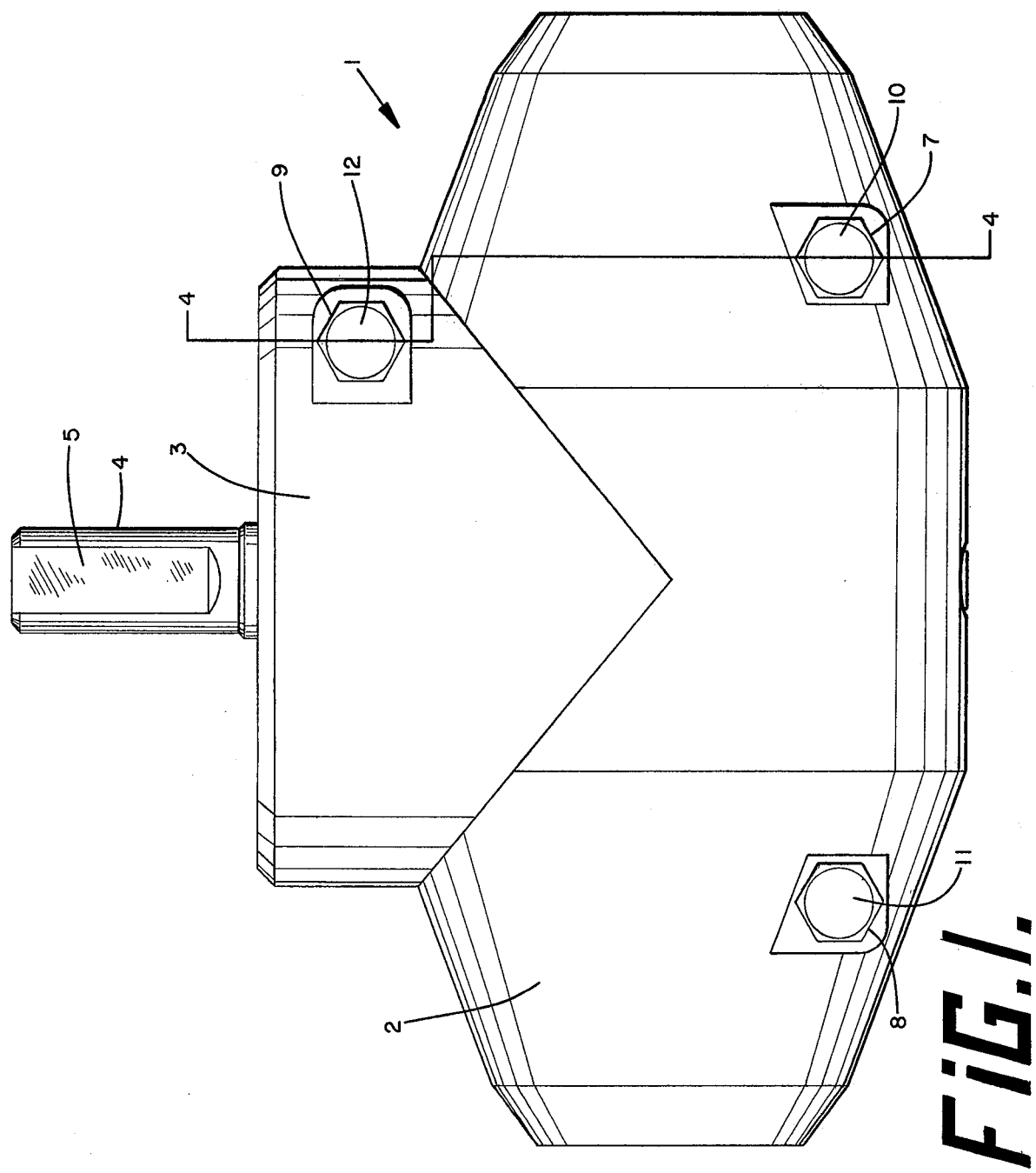
FIG. 1 is a side elevational view of a valve of the invention.
Figure 2:
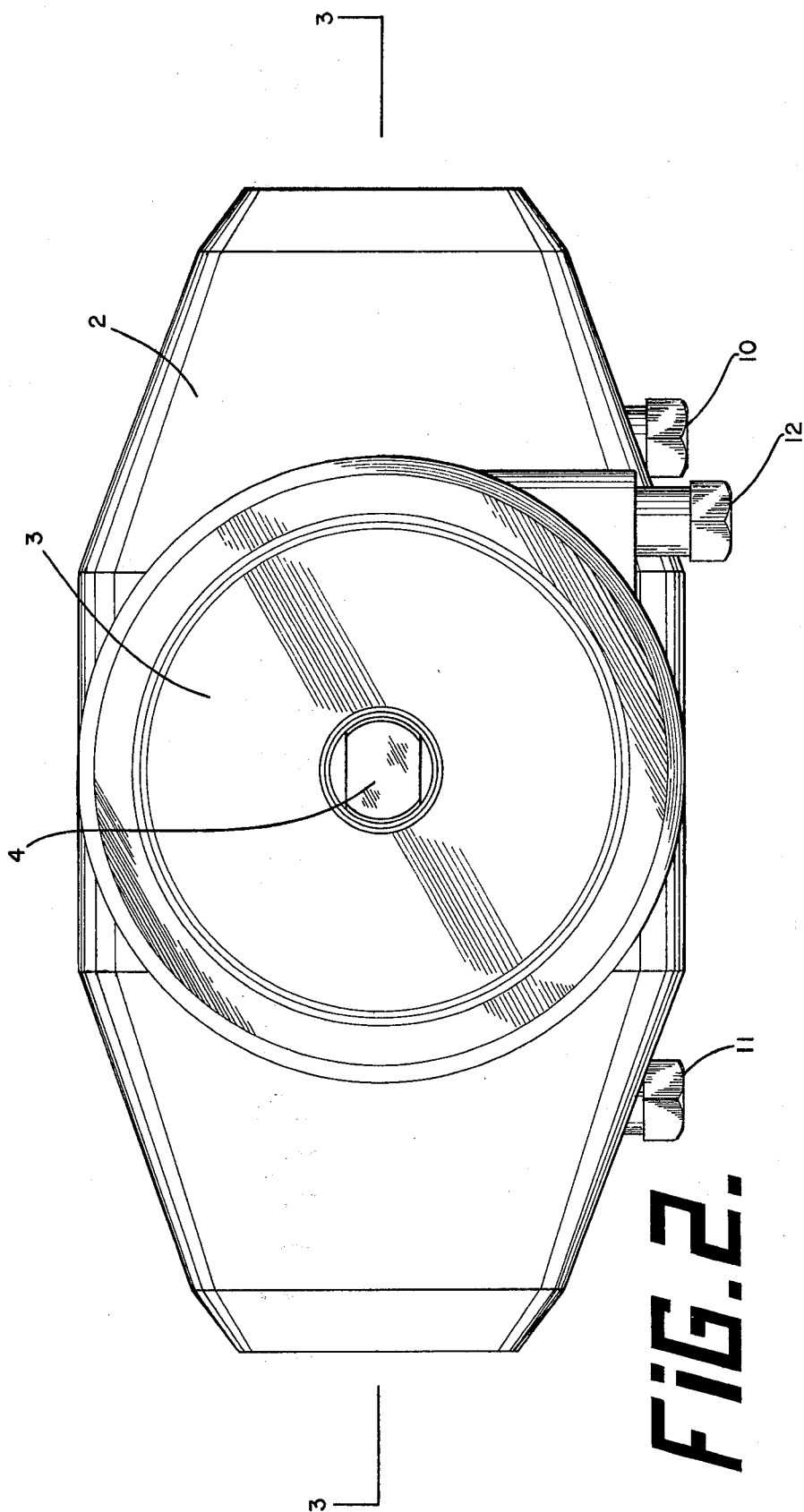
FIG. 2 is a top view thereof.

Referring first to the external appearance of the valve shown in FIGS. 1 and 2, valve 1 has a one-piece cast housing 2, a bonnet 3 for closing an opening in the top of the housing of sufficient size to insert and remove internal valve components, and a valve stem 4 extending through the bonnet and having milled parallel flat surfaces 5 and 6 to accommodate a wrench or handle. On the front surface of the valve are three male hexhead threaded bolt closures 10, 11, and 12 which fit ports 7, 8, and 9 in the housing, respectively. Ports 7 and 8 provide access to retainers of the invention for maintaining the axial position of the valve seats, and port 9 provides access to the bonnet fastener.

Figure 3:
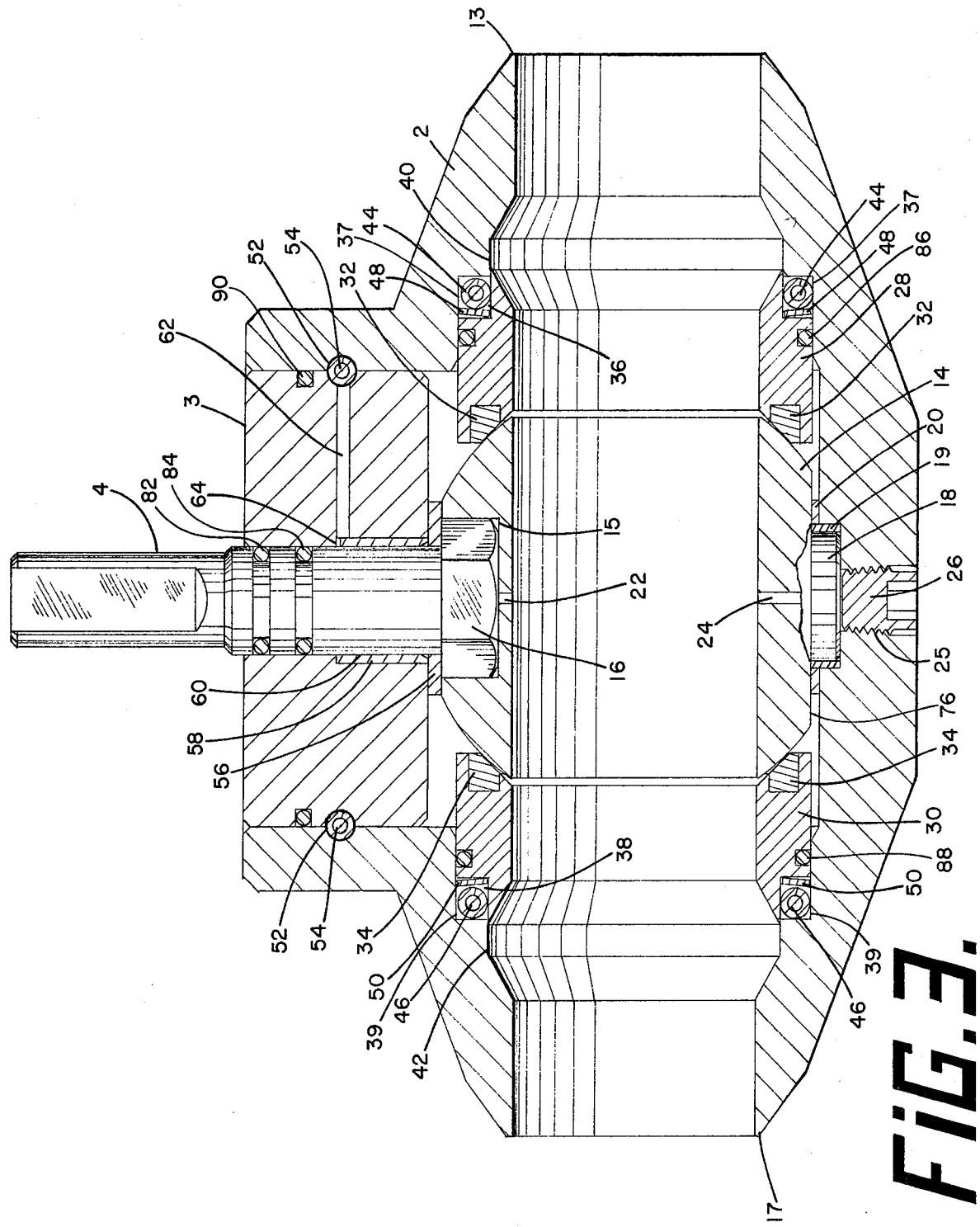
FIG. 3 is a partial section view of the side of the valve, with the section taken down the vertical center line of the valve.

The internal construction of the valve is best seen in FIG. 3. Valve housing 2 has a tubular bore therethrough for generally uninterrupted flow of fluid. The fluid ports are defined by openings in the ends 13 and 17 of the housing, which attach to a pipeline by welding. If desired, bolted or screwed flanges may be used instead of weld flanges.

The main internal components of the valve are valve body or ball 14 and seats 28 and 30 axially oriented on opposite sides of the ball. The ball is a generally spherical member having a machined bore therethrough. The ball is supported by a trunnion 18 machined on the bottom of the ball. The trunnion is centered at the bottom of the ball with an axis perpendicular to the flow bore through the ball. The trunnion is mounted in a recess in the internal wall of the valve housing by means of trunnion bearing 19 which is press fitted into the housing. A lower thrust washer 20 supports the flat bottom surface 76 of the ball. A hexagonal recess 15 in the top center portion of the ball is adapted to slidably receive hex-head fitting 16 at the bottom of valve stem 4, thereby enabling the stem to drive the ball between open and closed positions. In addition to driving the ball, the hex head works with the ball to form the upper trunnion.

The structure of the ball is completed with small radial bores 22 and 24. Bore 22 acts as a pressure equalizer at the top of the ball, while bore 24, which extends through the ball and through the trunnion, acts as a drain for trapped fluid. This drain communicates with an additional bore 25 in the valve housing. This bore is closed with threaded plug fitting 26, which is recessed into the bore to enable the valve to be set firmly on a flat surface, and is removable with a hexagonal wrench, e.g., an Allen wrench.

In addition to the ball, the valve chamber, which is defined by the inner walls of the valve housing, also contains identical seats 28 and 30. The seats are cylindrical rings having bore diameters substantially the same as the ball and the pipeline, and have synthetic seal rings 32 and 34 press-fitted into the forward faces of the seats. Depending on the service required of the valve, these seals may be fabricated from nylon, Torlon, Teflon, or similar material. Circumferential notches or grooves 36 and 38 are machined into the outer portion of the rear face of seats 28 and 30, respectively, to form a shoulder extending around the entire periphery of the rear of the seat. Corresponding shoulder portions 37 and 39 in the interior wall of the housing form with notches 36 and 38 a circumferential toroidal groove in the valve chamber to hold flexible retainers 44 and 46, which prevent axial movement of the seats away from the ball. When the retainers are removed, the valve seats may retract away from the ball, with the horizontal portions of the shoulders 36 and 38 of the seats sliding along the expanded diameter portions of the tubular flow bore through the housing 40 and 42. The cross-sectional view of the valve in FIG. 3 shows the seats in advanced position with the retainers in place. When the retainers are removed, the seats can slide axially between an advanced (sealing) position and a retracted position, the latter position freeing the ball for removal through the top of the valve.

Figure 4:
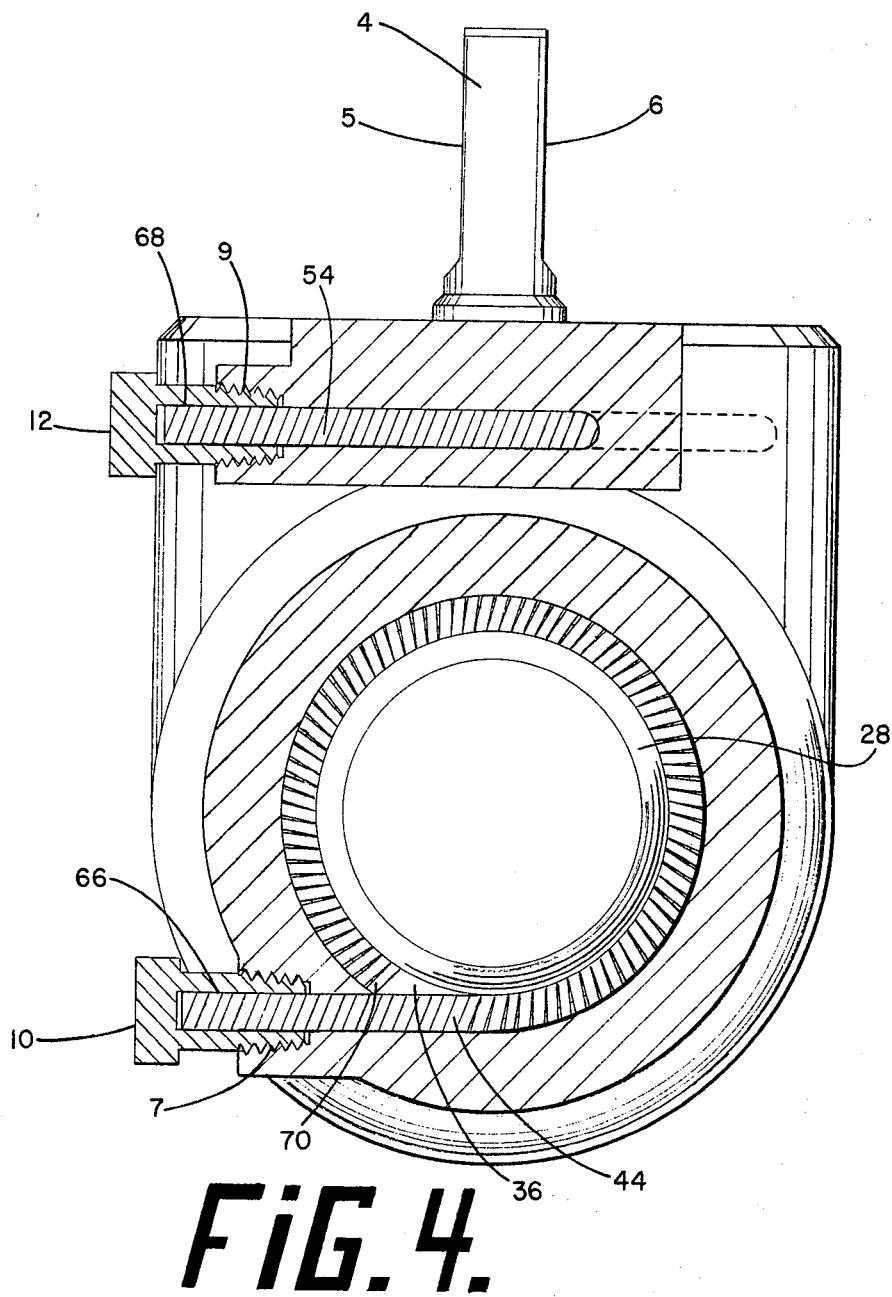
FIG. 4 is a partial section end view of the valve, with the section taken along lines 4—4 of FIG. 1.

The retainers, or fasteners, are elongate cable members fabricated by wrapping a center core of wire helically with similar diameter wire, thereby allowing flexibility in any direction while maintaining mechanical rigidity and substantial incompressibility radially. The retainers are of sufficient length as to entirely surround the gland at the rear portion of the seat, as is shown in FIG. 4. As shown in FIG. 4, after the valve seat 28 is in place, the retainer 44 is inserted through bore 7 in the housing, entirely encircling the rear portion of the seat. The fastener is maintained in place by bolted closure fitting 10, which has a recess 66 to receive the end of the fastener. The retainer is forced into and around the rear portion of the seat until the leading end 70 of the retainer contacts the retainer as shown in FIG. 4.

Referring again to FIG. 3, seat retainers 44 and 46 coact with springs 48 and 50 to maintain the seat in advanced position. The springs are located adjacent to and immediately forward of the retainers in the glands at the rear of the seats, and act to bias the seat toward the ball. The springs are flat washers which have been deformed by tapering from outside to inside diameter to assume a frusto-conical shape such that pressure is required to compress the washer to a flat shape. Accordingly, the washer acts like a compression spring between the retainer and the rear face of the seat. Since the springs are integral rings, they cannot be removed through the ports in the side of the valve housing, but rather must be removed through the opening in the top of the housing along with the seat. Seal between the annular retainer channels and the outer portions of the ball is maintained by O-rings 86 and 88.

The internal components of the valve can be removed from the valve chamber through the opening in the top of the valve housing which is closed with bonnet 3. The bonnet is fastened to the housing by means of a flexible retainer 54 similar in construction to seat retainers 44 and 46. As shown in FIG. 3, the retainer is inserted in a peripheral channel 52 extending around the circumference of the bonnet and formed by aligned grooves of semi-circular cross-section in the walls of the bonnet and the valve housing. The fit of the retainer in the channel is a relatively tight slidable fit, substantially preventing any movement between the outer surface of the bonnet and the inner surface of the housing.

Figure 5:
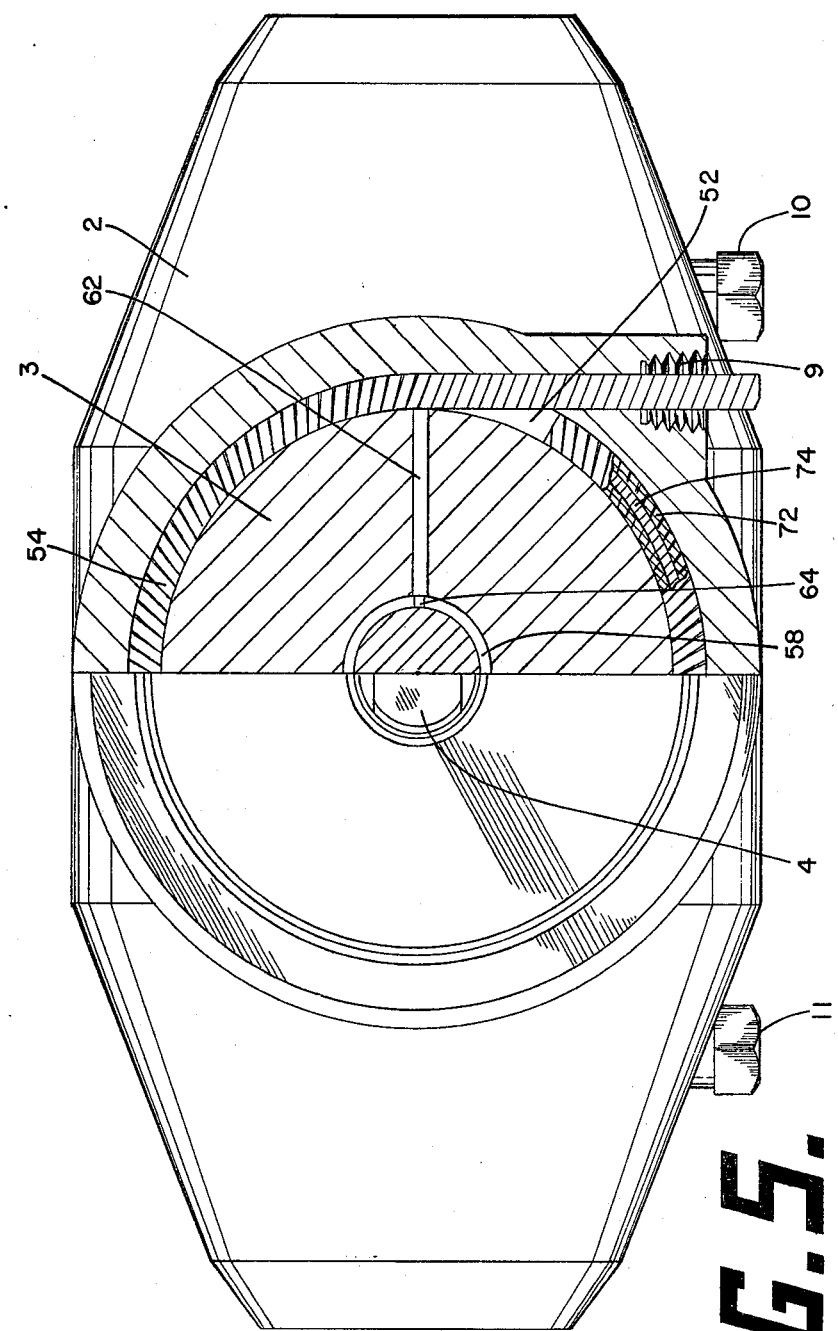
FIG. 5 is a top view of the valve, partially sectioned to show the bonnet retainer and the fastener configuration.

As shown in FIGS. 4 and 5, the bonnet fastener 54 extends around the entire length of groove 52, leaving the trailing end of the retainer extending out from threaded bore 9 in the valve housing. Bolt closure fitting 12 having recess 68 to receive the end of the retainer is shown fitted into the housing in FIG. 4. The fitting is shown removed in FIG. 5.

The valve stem is mounted in the bonnet by upper trunnion bearing 58 which is press fit into the bonnet. The bearing is a steel sleeve having a bearing face 60 made from Teflon-coated fiberglass. Nylon upper thrust washer 56 separates the hex head bottom portion of the stem from the bonnet and acts to reduce operating torque. Primary and secondary O-rings 82 and 84 rest in glands machined in the stem to prevent escape of fluid through the stem portion of the valve. Similarly, O-ring 90 retained in a gland in the bonnet prevents escape of fluid between the bonnet and the housing.

Lubrication of the stem bearing is effected through a small lubrication channel 62 in the bonnet which extends radially between the stem bearing and retainer channel 52, as shown in FIG. 5. A small notch 64 in the bearing communicating with the lubrication channel provides access of lubrication to the bearing face. Lubrication is effected by removing closure fitting 12 and injecting lubricant into channel 52 under force through port 9, while the retainer is in place in the channel. Lubricant is forced along a small clearance between the retainer and channel walls into the lubrication channel and into the notch 64 and to the bearing face. If desired, a combination lubrication fitting can be used in place of closure fitting 12, such that the fitting need not be removed to lubricate.

Figure 6:
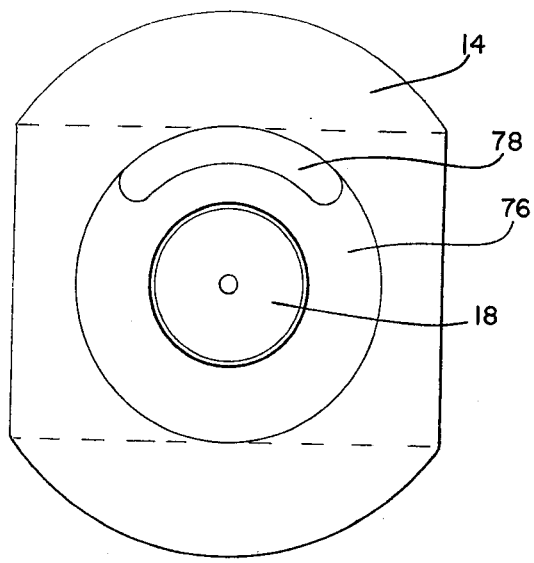
FIG. 6 is a bottom view of the ball.
Figure 7:
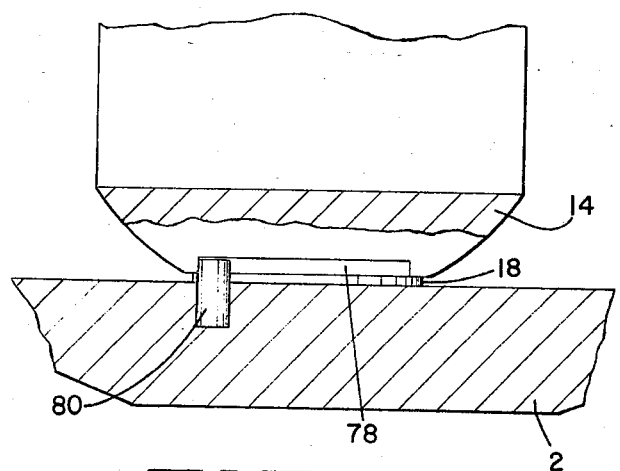
FIG. 7 is a partial section view of the ball and valve housing showing the stop means for rotation of the ball.

The ball valve of the invention is generally operated either in fully open or fully closed position, but may be operated at any position in between. The stem is rotatable through an angle of 90° to open or close the valve; the stop mechanism is shown in FIGS. 6 and 7 of the drawings. FIG. 6 is a bottom view of the ball showing a milled slot 78 in the flat bottom surface of the ball 76 extending 90° around the periphery of the surface. A stop pin 80 is mounted in a blind bore in the floor of the housing 2, extending upwardly above said floor and into slot 78, thereby permitting rotation of the ball only through a 90° arc.

The retainers or fasteners 44, 46, and 54 are the most important features of the valve of the invention. These retainers are made from stainless steel or low grade carbon steel having good corrosion resistance and are fabricated by helically wrapping a flat wire around a center core of the same round wire. As shown in the partial section of retainer 54 in FIG. 5, a center core 74 of steel wire having a diameter of 0.080 inches (14 gauge, Steel Wire Gauge) is tightly wrapped helically with a separate piece of the 14 gauge flat wire 72. Accordingly, the wrapped portion of the wire comprises about two-thirds of the diameter of the wire, with the center core comprising the additional one-third of the diameter.

The resulting retainer has complete flexibility in any direction but is substantially incompressible along its radius, thereby being able to resist very large shear forces. Because of the flexibility of the retainer member, it is easily insertible into the appropriate channels in the interior of the valve by gently tapping the end with a hammer. Similarly, the retainer is easily removed either by hand, or, if necessary, by grasping the exposed end (see FIG. 5) with pliers and pulling straight out from the port in the housing. Generally, the bonnet retainer is easily removed by hand, whereas the seat retainers require a stronger pulling force because of the friction caused by the force exerted by the spring on the retainer. Alternately, by reinserting the stem and compressing either of the seats completely, the opposite seat retainer can be removed without force.

Cable retainers made from 14 gauge wire may be used in large or small (e.g., 2"-12") valves, although obviously wires of different diameters may be used if desired to be more consistent with overall valve size. While the valve of the invention has been tested in service in excess of 3,000 psi, the true structural shear strength of a 0.240" diameter cable constructed from low carbon or stainless steel approaches 30,000 psi. Even using a safety margin of 4:1, a 3,000 pound load would require a cable diameter of about 0.120" (40 gauge). The strength may of course be increased by increasing the wire diameter and/or the number of wraps. For example, increasing the total cable diameter to 0.400" would increase the tensile strength to about 50,000 psi. Since retainer service does not require a true shear load on the cable, the shear strength required in this application is approximately equal to the tensile strength.

The particular construction of the valve of the invention permits very simple assembly and disassembly and in-line service. To disassemble for service a valve operating in a pipeline, after shutting off an upstream valve, an operator would first slightly unscrew bonnet closure fitting 12 to relieve pressure and then would remove the fitting. He would then remove the hexhead drain fitting 26 at the bottom of the valve to release any fluid captive in that area. The bonnet retainer would then be removed by simply pulling it out. The bonnet and stem can then be lifted away from the top of the valve, exposing the ball. At this point, the stem O-ring seals and bonnet-to-body O-ring seals may be replaced.

If the seat seals also needed replacing, closure fittings 10 and 11 would be removed and seat retainers 44 and 46 would be pulled out from the orifices 7 and 8 in the housing. Since a resistance to removal of the seat retainers is caused by pressure exerted by the springs, it is generally necessary to use a pair of pliers to pull the retainers free. The seats may then be retracted from the ball either by moving the valve body back and forth by hand or, in larger valves, by inserting a screw jack into the drain fitting at the bottom of the valve. By moving the jack upwardly, the ball would be projected upwardly and out of the top of the valve, automatically pushing both seats away from the ball. After the ball is removed, the seats may be removed one at a time through the orifice in the top of the housing.

After the seals have been replaced, the springs are replaced on the ends of the seats and the seats are returned to the valve chamber. The ball is then reinserted into the chamber and the seats are pried forward back up onto the ball, e.g., with a screw driver. Next, the seat retainers are placed into channels at the rear of the seats. Because of the pressure exerted by the spring, it is necessary to use a hammer to tap the retainers back into position or to use the cocking method previously described. While the retainer cable is sufficiently flexible to bend, it is also sufficiently rigid to be forced back into position with mild impacts. Thereafter, the bonnet and bonnet retainer are returned to their appropriate positions and the closure fittings are returned to the ports in the housing.

In operating, pressure in the valve attempts to escape at both the front and back portion of the seat. Leakage at the front of the seat is stopped by the seal ring, and leakage at the back of the seat is prevented by the O-ring. Accordingly, the pressure on the back and front surfaces of the seat cancel each other, and the net forward biasing pressure of the seat seal against the ball is the pressure from the spring (about 20 pounds per linear inch of seal).

The materials of construction of the valve are conventional and will vary depending on the type of service required of the valve. The housing, ball, springs, retainers, and seats are made from low carbon steels, stainless steel, bronze, or any other material generally used for valves. The spherical diameter of the ball, as well as the seats, retainers, and springs, may be plated with nickel or chrome if a caustic service is required. The face seals may be nylon in ordinary service, but would more likely be Torlon at elevated temperatures, or Teflon for use with unusually caustic fluids. The O-rings may be Viton, Hyear, Nitril, or Butiral, or any material suitable for the service required.

Valves of the invention have proven to be highly successful in high pressure tests, with no leakage shown under air and hydrostatic pressures in excess of 3000 psig.

Many variations of the invention may be made within its spirit and scope and will be apparent to those skilled in the art. For example, while a particular frusto-conical seat spring has been shown, any type of compression biasing means may be used in conjunction with the retainers. Accordingly, the invention should not be limited by the foregoing description of a preferred embodiment, but should rather be limited only by the following claims.

I claim:

1. In a fluid flow valve assembly comprising
   a valve housing having a valve chamber formed by inner walls of the valve housing and flow ports connectible to a fluid flow line,
   a generally spherical valve body rotatably mounted in the valve chamber and having an axial passage therethrough,
   means for rotating the valve body within the valve chamber,
   a valve seat axially slidably mounted within the valve chamber comprising a cylindrical ring having a circumferential sealing forward surface adjacent the valve body,
   the improvement therein which comprises
   (a) a uniform circumferential recess on a rearward portion of the seat,
   (b) a circumferential shoulder on the valve chamber wall, said recess and shoulder forming an annular channel,
   (c) a port in the valve housing communicating with the channel and opening tangentially into the channel,
   (d) an elongate flexible retainer fabricated from flat wire wrapped helically around a core member, substantially incompressible along its cross-section, located in the channel thereby preventing axial movement of the seat away from the valve body, said retainer being insertable and removable through the port in the valve housing, and
   (e) biasing means acting along the sliding axis of the valve seat to urge the retainer against the valve body.

2. The valve assembly of claim 1 wherein the retainer comprises a cable having a substantially uniform circular cross-section.

3. The valve assembly of claim 2 wherein the cable is fabricated from a plurality of wrapped wire strands.

4. The valve assembly of claim 2 wherein the biasing means is substantially coextensive with the retainer.

5. The valve assembly of claim 2 wherein the biasing means comprises a frusto-conical ring.

* * * * *